June 15, 1954  F. D. BUTLER  2,680,949
INTERNAL-COMBUSTION TURBINE HAVING
ROTATING COMBUSTION CHAMBERS
Filed Oct. 18, 1951  5 Sheets-Sheet 4

INVENTOR
Frank David Butler

Patented June 15, 1954

2,680,949

UNITED STATES PATENT OFFICE 2,680,949

INTERNAL-COMBUSTION TURBINE HAVING ROTATING COMBUSTION CHAMBERS

Frank David Butler, Venice, Calif.

Application October 18, 1951, Serial No. 251,967

17 Claims. (Cl. 60—39.34)

In general my invention relates to internal combustion turbine power plant assemblies for all types of uses applicable and particularly for automotive drive purposes, and wherein the products of combustion therein are provided to be pressure velocity compounded.

The principal object of this invention is to provide a simple and relatively inexpensive internal combustion turbine that will operate on a definite cycle system and that will deliver the power developed in it at a reduced speed of rotation relative to its main shaft speed. This method of application provides for a relatively high peripheral speed of the turbine rotor as compared with the slower speed of rotation of the delivery shaft and results in a relatively higher volumetric and thermal efficiency per pound of weight of the motive power unit as a whole.

One of the unique features of this invention is doubtless the methods used in obtaining the definite cycle system of operation of the turbine including the dual two direction pressure velocity compounding of the combustion gases and the fluid drenching positive type of fuel mixture compression system employed. Other unique features and devices include the provision employed of combining the fuel mixture compression system with the turbine speed reduction system, the extreme radius from the main shaft axis at which power is delivered from the turbine rotor as compared with a similar radius on a similar size reciprocating internal combustion engine, the internal induced draft air cooling system provided and employed on the turbine rotor, the relatively numerous combustion chambers employed, power development four times each revolution of the main shaft by each of these numerous combustion chambers, and its many other true turbine features of operation.

As a matter of information to the reader, it is my intention of applying this internal combustion turbine as the motive power means, forming the intermediate portion of the rear axle housing, in connection with and for driving a pair of oppositely located traction wheels of an automotive vehicle, as illustrated, wherein each wheel is equipped with a variable, reversible hydrodynamical transmission assembly.

Other objects of this invention include the combining and coordinating of the various features mentioned in an internal combustion turbine unit assembly, and other minor improvements in this art that will be noted as the specification description progresses.

With reference to the accompanying drawings forming a part hereof.

With further reference to the drawings, similar numerals indicate similar parts in the several views and figures; the numeral 1 indicates an elongated tubular shaft which is provided to be journalled and rotated on a pair of tapering and adjustable roller bearings 2 and 2' concentrically within the elongated cylindrical stator casing 3 of the turbine and also in an elongated gear housing 4 and to be adjustable in said bearings by the adjustment nut 5 and tongued washer 6 and also by the auxiliary adjustment shims 7; said shaft 1 is provided with a relatively large diameter integral spline 8 over which the elongated internally splined turbine rotor 9 and the internally splined electrically insulated distributor rotors 10 and 10' are all a press-fit; said shaft 1 is also provided with a relatively smaller diameter integral spline 11 over which the elongated internally splined compressor drive sun gear 12 and the internally splined reduction gear assembly sun gear 13 are both a press-fit; fluid seal rings 14 and 14', having garter type of tension spring means, are located adjacent to the roller bearings 2 and 2' in the flanged head-plate 15, of the turbine, and the flanged, combined turbine and compressor, head-plate 15' respectively; said turbine casing 3 is securely held concentrically with said shaft 1 and rotor 9 by the rabbet type of joints formed between the counter-bores 3B' of stator bores 3B and the flanges of said head-plates 15 and 15' and also by the plurality of bolts 16 and 16' which latter draw said head-plates securely against the end faces of said stator 3.

As the turbine herein illustrated is intended for driving a pair of my variable reversible transmission couplers combined in opposite traction wheel assemblies, the rotor 9 is provided to rotate in one direction only and to consist of; an elongated internally splined hub portion 9' and an elongated annular shaped rim 9" integral with a series of symmetrically spaced spokes and/or blades 17 which extend radially and helically longitudinally through said rim and connect the latter to said hub portion; a plurality of rows of elongated, preferably cylindrical, combustion chambers 18 located in said rim 9" and extending parallel to the axis of said rotor 9 and provided to be spaced symmetrically about the latter with each in a different degree of arc relative to one another and each provided with one or more conically shaped communication nozzle ports 19 each extending tangentially from the periphery of said rotor into its respective combustion chamber in the direction of rotor rotation; an annular shaped exhaust passage 20 located jointly in said rotor and said stator 3 intermediate to said plurality of rows of combustion chambers 18 and in constant communication with the exhaust pipe 21 through the exhaust manifold 22 which latter is secured to casing 3 by and with the plurality of stud-bolts 23; a detachable combustion chamber cover 24 containing an ignition-plug 25, one for each one of said combustion chambers 18 and each provided to be secured to its respective combustion chamber 18, with a copper gasket 27 therebetween, by a plurality of cap screws 26; a plurality of rows of semi-circular shaped diagonally extending buckets 28, each provided to be machined tangentially into said rotor 9 in the direction of its rotation, with each row located closely adjacent to a row of ports 19 and a row of combustion chambers 18; and, a plurality of access holes 29 symmetrically spaced around the axis of the rotor 9 and extending axially through the hub 9' and which are provided to receive the plurality of elongated pencil shaped electrically insulated ignition conductors 30 which latter extend between the electrical ignition distributor rotors 10 and 10', previously mentioned, and connect a row of electrical conductor segments in each of the latter and which will be described later.

The electrical ignition system of the turbine consists of: a pair of, preferably non-grounded secondary, six volt high tension vibrating contact point type of ignition induction coils 31 provided to be mounted and secured in an electrically insulated covered box 32 located closely adjacent to the stator 3 head-plate 15 and each coil 31 provided to have its primary windings, not shown, connected together in series with an electrical conductor wire 33 and to have one end of its primary winding grounded as at 33' and the other end as at 33" supplied with direct current electricity having a potential of 12 volts, it being intended that one of the primary circuit interrupter contact points, of one of the coils 31, be used as an alternate spare and thus adjusted to constant contact while the contact points of the other coil are adjusted properly and thus used to simultaneously and continuously interrupt the primary circuits in series of both of said coils, thereby causing a simultaneous and continuous vibrating high potential ignition spark across the two ends of each secondary winding of each coil 31, and thus capable of accommodating two pairs of ignition plugs simultaneously. The enclosed electrical ignition system consists of: an annular shaped distributor block 35 secured to the headplate 15 concentrically with the shaft 1 by the cap-screws 36, as illustrated in Fig. 8, and provided with two pairs of, cast in place, electrical conductors 37 and 37', as in Figs. 1 and 8, connected via the terminal outlets 38 and 38' by pairs to the two ends of each secondary winding of each of said coils 31 respectively; a row of series of conductor segments 39 and an adjacent similar row of series of segments 40 arranged in groups and connected to conductors 37 and 37' respectively and terminating in the bore of said block 35; an electrically insulated, internally splined, distributor rotor 10 rotatable with shaft 1, and located internally to said bore of said block 35, and containing two rows of segments 39' and 39" which are interconnected and are cooperative between segments 39 and the adjacent row of ignition plugs 25, and one row of segments 40' cooperative between said segments 40 and the other row of ignition plugs 25 via the insulated pencils 38, and the row of segments 40" in the other distributor rotor 10', and wherein, by using a ground return between paired ignition plugs, at least four ignition plugs will be receiving ignition electricity simultaneously and in a predetermined firing order sequence by rows and pairs.

Figure 1:
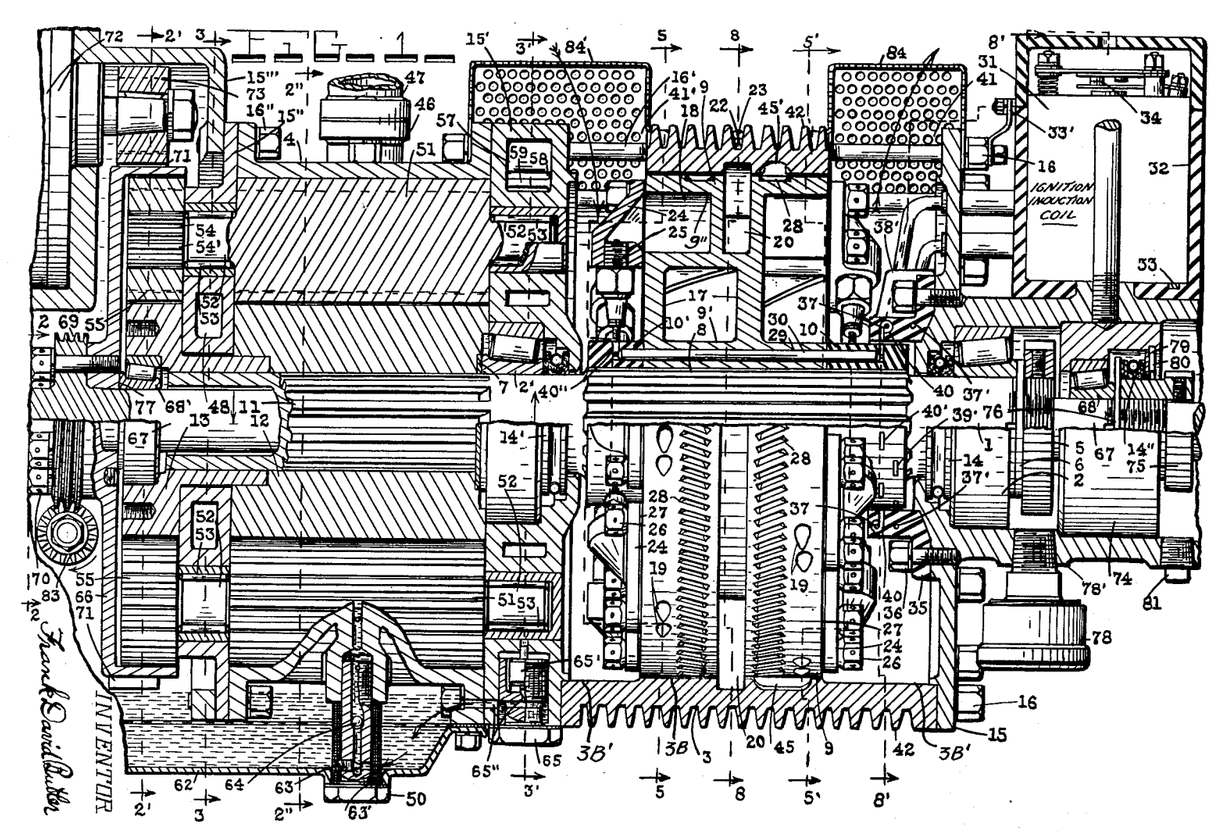
Fig. 1 is a broken away and longitudinal section, partly in elevation, of my internal combustion turbine assembly in general and as it would appear on the dotted broken lines 1—1 of Figs. 2, 3, 5 and 8.
Figure 2:
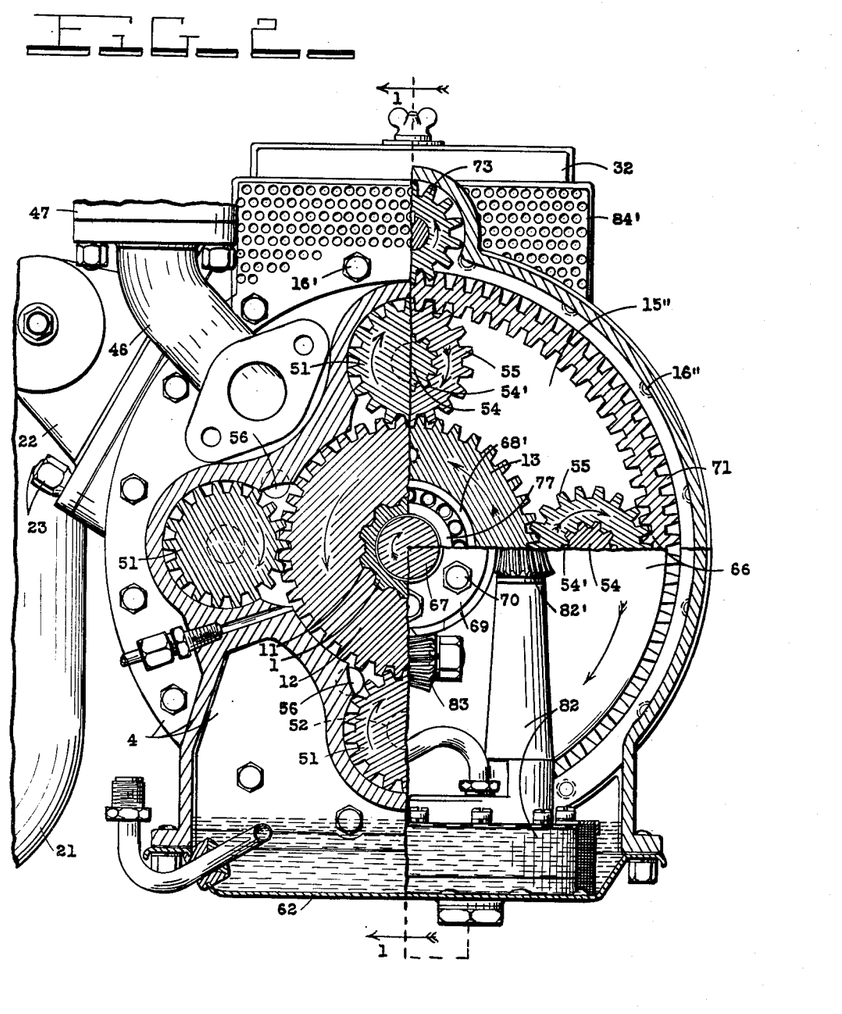
Fig. 2 is a transverse section of the turbine, partly in elevation, with the lower right quarter of the figure illustrating the lubricating oil pump and gasoline pump worm drive means at it would appear on the dotted and broken lines 2—2 of Fig. 1, the upper right quarter illustrates the speed reduction gearing and the combined generator and starter drive means as they would appear on the dotted and broken lines 2'—2' of Fig. 1, and the left one half of the figure illustrates the fuel mixture compressing gearing as it would appear on the dotted and broken lines 2''—2'' of Fig. 1.
Figures 3, 4:
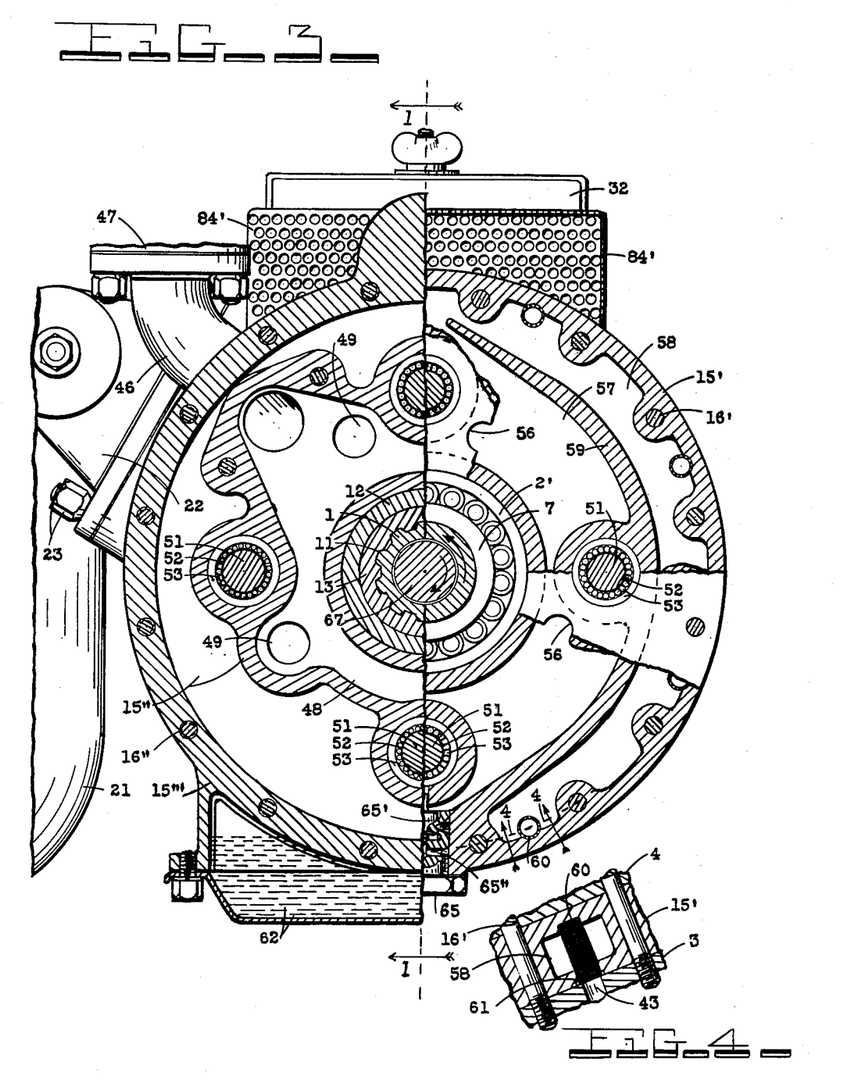
Fig. 3 is a transverse section of the turbine, partly in elevation, with the left one half of the figure illustrating the fuel mixture connection means extending between the carburetor and the fuel mixture compressor as it would appear on the dotted and broken lines 3—3 of Fig. 1, and the right one half of the figure illustrating the compressed fuel mixture delivery and baffle means, partly broken away for better disclosure purposes, located on the discharge side of the compressor gearing as such means would appear on the dotted and broken lines 3'—3' of Fig. 1.
Fig. 4 is a detail of one of the fuel mixture strainers, for preventing backfire ignition of such mixture within its discharge system, as such strainer would appear on the dotted and broken lines 4—4 of Fig. 3.
Figure 8:
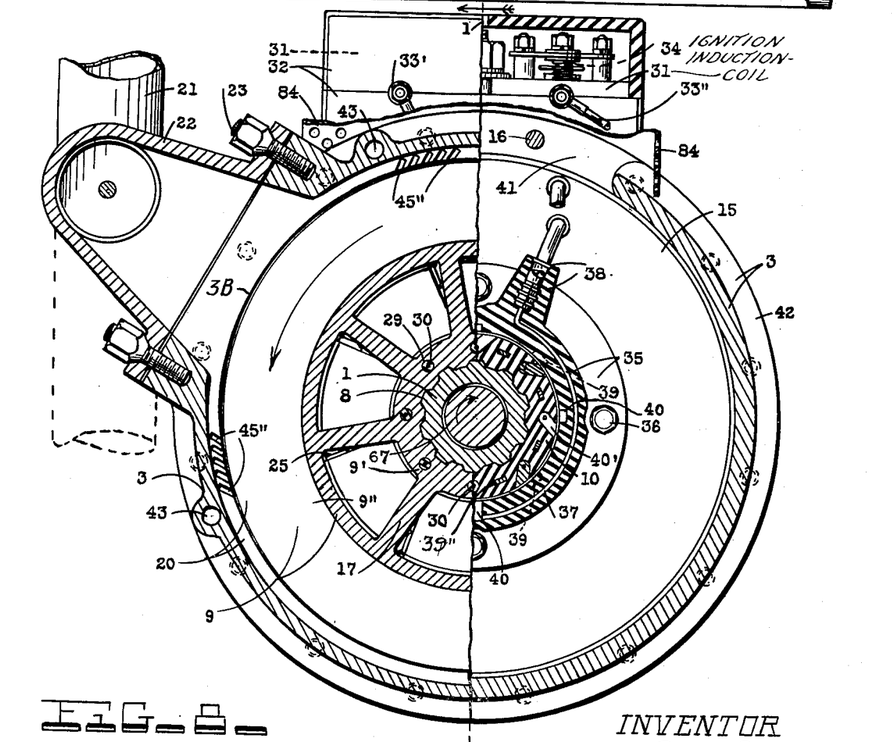

The elongated, annular shaped stator casing 3 consists of: a concentrically located main bore 3B provided to receive the rotatable rotor 9, and terminating at its extreme ends in the counterbores 3B'; an annular shaped cooling air inlet access compartment 41' located inside of one of said counterbores 3B' and provided with an inlet access extending through the top of stator 3 into such counterbore; a similar hot air outlet access compartment 41 located in the other counterbore and similarly extending out through stator 3 at the top thereof; a series of tapering annular shaped cooling fins 42 integral with the periphery of said stator and wherein the extreme end fins form bolting and alining flanges with headplates 15 and 15'; a series of symmetrically spaced, fuel mixture delivery, access holes 43 located in the rim of said stator and, with reference to Figs. 3 and 4, provided for connections between the fuel mixture compressor accumulating compartment and the individual tapering diffuser nozzles 44, described in detail hereinafter; a pair of rows, of series of groups, of series of curved expansion chamber buckets 45 and 45' and combined expansion and exhaust chamber buckets 45" all of different predetermined lengths and provided to extend tangentially from said bore 3B into said stator opposite to the direction of rotor rotation therein, and which buckets will be described more in detail hereinafter; an annular shaped exhaust compartment 20, located intermediately in the length of the bore 3B and connected externally to the exhaust manifold 22 as illustrated in Figs. 1 and 8; and, a means 16 and 16' of alining and bolting such stator between said head-plates 15 and 15' concentrically to shaft 1.

Though it is obviously apparent that, in relatively large turbines of this type, the fuel mixture and ignition electricity could be delivered thereto from an auxiliary compressor and generator respectively via a combined fuel mixture and ignition electricity distributing device and wherein the fuel mixture diffuser nozzles and the ignition plugs were located in the periphery of the stator 3, with one such diffuser nozzle and one such ignition plug in series with each internal combustion power cycle expansion group, it is equally as obvious that in relatively small and compact unit power plant assemblies, of the type illustrated herein, the fuel mixture compressor, at least, be a direct enclosed part of such an assembly unit.

The fuel mixture compressor used in direct connection with this turbine is of a liquid fuel drenched multiple-geared type wherein such fuel mixture is compressed by the gears proper in a positive manner, and wherein such compressor is in tandem combination with a multiple-geared type of reduction gearing means located on one side thereof, and with the turbine rotor and stator on the opposite side thereof, and wherein such compressor consists of: a compressor drive sun-gear 12 coaxially rotatable with the shaft 1, of the turbine rotor 9, and with the adjacent sun-gear 13 of said reduction gearing means; a series of compressor gears 51, symmetrically spaced about the axis of and meshing with said sun-gear 12 and each extending in tandem with a similar series of reduction gearing gears 55 which latter each mesh with said sun-gear 13 and also with the internally toothed, orbit-gear 66 of said reduction gearing means, and including external teeth 71 on gear 66, forming a ring-gear, meshing with the pinion gear 73 of the combined electrical generator and starting motor 72 of the turbine assembly; means for taking fuel mixture suction from the carburetor 47 via the elbow 46, the cored cavity 48 and the access passages 49 to the out-meshing sides of each of said gears 51 with said sun-gear 12, and simultaneously taking combustible liquid suction from the combined reservoir and sump 62 via the spray-nozzle 50 provided with the adjustment valve 63 and non-return check-valve 64 in series therewith; means for discharging compressed elastic fuel mixture from adjacent the in-meshing sides of each of said gears 51 with said sun-gear 12, into the pressure accumulating compartment 58, Figs. 1 to 4 inclusive, via the series of access passages 56 and over the baffle partition 59, separating the cored cavities 57 and 58 forming said accumulating, and/or receiver, compartment, and which discharge includes connections with each of the access ports 43 via their respective back-fire prevention screens 60, which latter are secured in place in their respective recesses 61 as per Fig. 4; means for returning surplus combustible lubricant liquid automatically from the base of said accumulating compartment 58 to said sump 62 via the float-type of trap-valve 65 located between such compartment and sump; reduced diameter extension journal means 52 integral with each of said gears 51 and upon which to journal the latter upon the needle type roller bearings 53 within the hardened bushings pressed into the headplates 15' and 15"; projecting extensions 54 on journals 52 forming splines 54' for securing the gears 51 and 55 in tandem combination; suitable chambers in the gear-housing 4 for receiving the rotatable gears 12 and 51; and, suitable bolt and flange means for securing said housing 4 in alinement between said head-plates 15' and 15", and for securing said sump 62 to said housing 4 and head-plates 15" and 15'''.

Inasmuch as the power delivery shaft 67 extends internally to the tubular rotor shaft 1 and is driven by the latter through said multiple geared reduction means, such shaft 67 thus rotates in the opposite direction to and at a reduced speed in relation to said shaft 1 and is rotatively supported beyond both ends of the latter by the opposed pair of tapering roller bearings 68 and 68' which bearings are adjustable by the nut 75 and tongued locking washer 76. The combined internally and externally toothed orbit-gear 66 is flanged shaped and is bolted at its hub to the flanged worm-gear 69 which latter is integral with the delivery shaft 67 and is used in connection with the worm-wheels 82' and 83 for respectively driving a geared lubricating pump, Fig. 2, and gasoline pump not illustrated.

Figure 7:
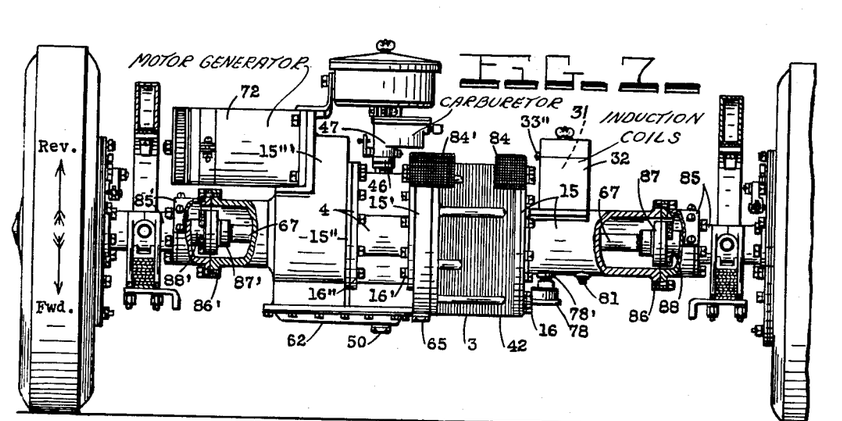
Fig. 7 illustrates the internal combustion turbine assembly unit as applied as the motive power means for driving two oppositely located traction wheels each equipped with a transmission coupler assembly as the entire combined assemblies would appear from under such automobile and looking towards the rear end thereof; and, Fig. 8 is a transverse section, partly in elevation, of the turbine with the left one half of the figure illustrating the exhaust gas access between the turbine rotor and the turbine exhaust pipe and as it would appear on the dotted and broken lines 8—8 of Fig. 1, and the right one half of the figure illustrating a distributor of the turbine ignition system and as it would appear on the dotted and broken lines 8'—8' of Fig. 1, such ignition system being illustrated in Figs. 1, 5, 7 and 8.

With reference to Fig. 7, the connection means between the turbine assembly and the two oppositely located traction wheels, each containing one of the variable reversible transmission couplers previously mentioned, consists briefly of: the turbine combined headplates and housings 15 and 15''' are flanged bolted to the adjacent flanged axle housings 85 and 85' respectively of such combined coupler and wheel assemblies; the internally, press-fit splined couplings 87 and 87' at the ends of shaft 67 are flanged bolted to the adjacent internally, slidable-fit splined couplings 88 and 88' respectively of the stub-shafts, not illustrated but driving said couplers and, thus the turbine, fuel mixture compressor and reduction gearing tandem assemblies, including the stator 3, gear housing 4 and the headplates 15, 15', 15'' and 15''' all in tandem, form the intermediate portion of the rear axle stub-shaft housings 85 and 85' extending between said traction wheels.

Figures 5, 6:
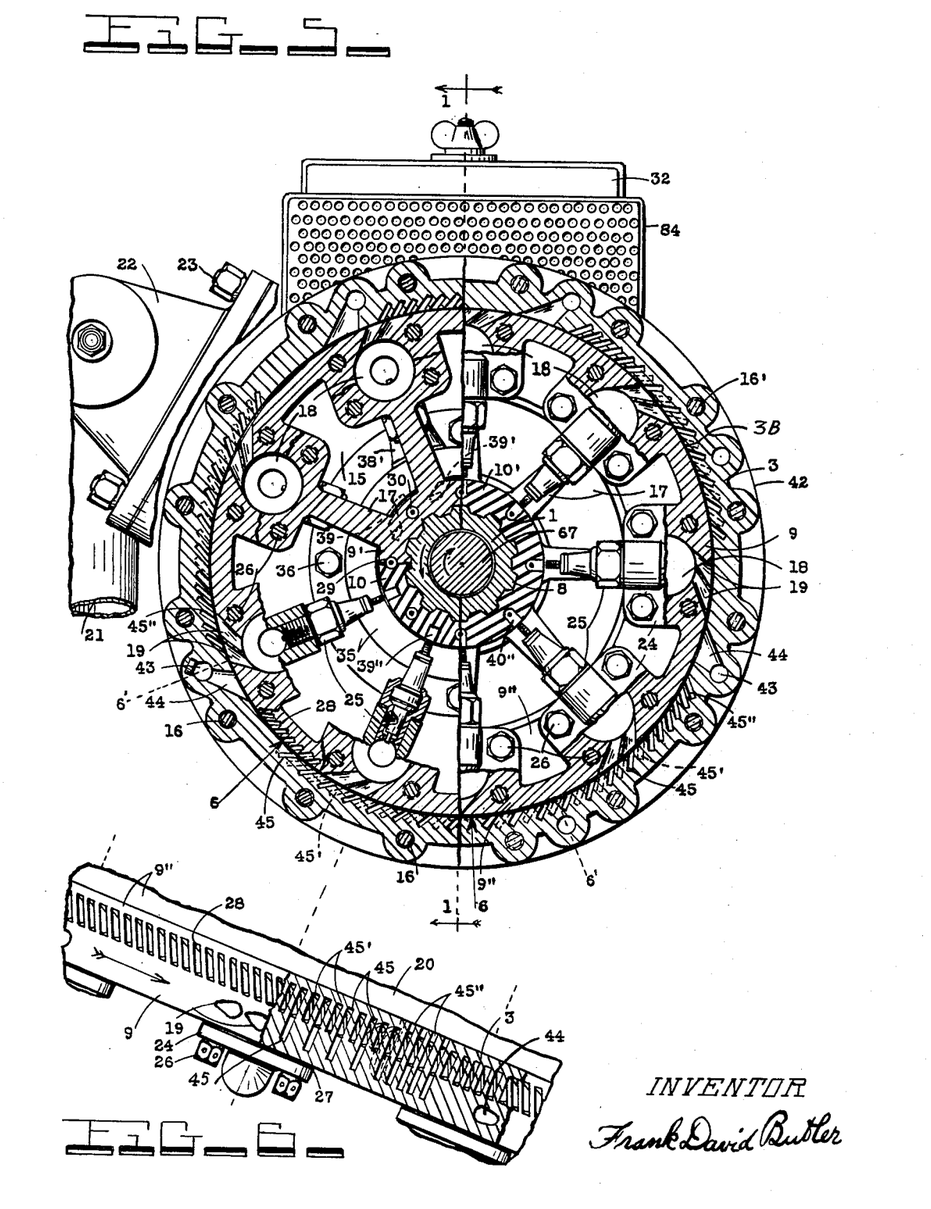
Fig. 5 is a broken away and transverse section of the turbine, partly in elevation, with the right one half of the figure illustrating the relative positions of the combustion chambers at one end of the turbine rotor and as the various parts of the combustion chamber assemblies would appear on the dotted and broken lines 5—5 of Fig. 1, and the left one half of the figure illustrates, with parts broken away for better detail illustration, the combustion chamber assemblies at the opposite end of the turbine rotor and as these assemblies would appear on the dotted and broken lines 5'—5' of Fig. 1.
Fig. 6 is a detail diagrammatic and circumferential projection with the right one half of the figure illustrating the porting located in the turbine casing at a location slightly outward radially from the outer circumference of the turbine rotor and as such porting would appear on the dotted and broken lines 6—6 of Fig. 5, and the left one half of the figure illustrating the porting in the outer circumference of the turbine rotor and as it would appear on the dotted and broken lines 6—6 of Fig. 5.

With general reference to all the figures and particularly to Figs. 5 and 6, the operation of the internal combustion turbine motive power assembly unit is as follows: by simultaneously introducing an electrical current to the combined electrical generator and starting motor 72, and to the two ignition coils 31 in series with one another, the shaft 1 including the rotor 9, the compressor sun-gear 12 and the reduction gearing sun-gear 13 are all rotated coaxially in tandem in the one direction of rotation, while the delivery shaft 67 including the sun-gear of each opposite coupler traction wheel assembly are rotated, at a reduced speed, in the opposite direction of rotation through said reduction gearing means; as the fuel mixture is compressed between the numerous meshing teeth of the sun-gear 12 and the several meshing teeth of gears 51 of the combustion liquid drenched compressor, it may be delivered, under a relatively low pressure in a predetermined manner to all of the diffuser nozzles 44 collectively via the series of ports 43, or under a relatively high pressure individually in a predetermined manner; as such compressed fuel mixture passes through each conically shaped diffuser nozzle 44, it expands and thus increases simultaneously in volume and velocity and exerts a tangential thrust against the conical nozzle valve-ports 19, in the rotor 9, as such rotor is rotated and the nozzles 44 and 19 form cooperation, and simultaneously such fuel mixture absorbs heat due to its drop in pressure and relative temperature, as each nozzle valve-port 19 forms communication with each nozzle 44 of each group of internal combustion power producing groups, the compressed fuel mixture entering the adjacent combustion chamber 18, via the leading valve-port 19, displaces and thus scavenges the residue gases and forces such gases out of such combustion chamber into the exhaust passage 20 via the trailing valve-port 19 and adjacent cooperative exhaust chamber bucket 45''; the combustion chamber is then charged with fuel mixture and such charging is terminated as valve-port 19 ceases cooperation with nozzle 44; the charge of fuel mixture within the combustion chamber 18 is then ignited by the ignition plug 25; combustion of the fuel mixture charge immediately follows its ignition, and momentarily it is retained in said combustion chamber until it reaches its maximum combustion pressure; then, as the leading valve-port 19 forms cooperation with the adjacent, medium length, expansion chamber bucket 45, such products of combustion drop rapidly in pressure and simultaneously increase in volume and velocity as such products flow from said combustion chamber 18 via such leading valve-port 19 into such bucket 45 and thus exerts a tangential reaction thrust forcing said rotor 9 to rotate in said stator 3; from the opposite end of such bucket 45, which latter should preferably have curved ends and should increase in depth gradually, the expanding products of combustion flow and expand into the opposite ends of two adjacent cooperative buckets 28, in the rotor 9, and thus provides such rotor with a unique dual impulse thrust extending tangentially in the direction of rotation, and wherein the velocity of flow of such products of combustion is absorbed due to the rotation of the rotor, during each time such products pass through any of the buckets 28, also it should be kept in mind that due to the expansion of such products of combustion, heat is being continuously absorbed from surrounding surfaces; from the opposite ends of said two adjacent buckets 28, such products of combustion uniquely expand into the adjacent ends of two of the adjacent, relatively short length, expansion chamber buckets 45', and thus there results a dual reaction tangential thrust being applied to rotate said rotor, and such unique dual expansion of such products of combustion continues so thereafter in two different directions, in the stator 3, in relation to rotor rotation; simultaneously each instant said valve port 19 cooperates with the next succeeding bucket 45, additional products of combustion flow from said combustion chamber 18; and, ultimately, after such products of combustion are void of kinetic energy, they are then exhausted via the combined expansion and exhaust chamber buckets 45'' into the atmosphere via said exhaust passage 26, and thereby complete the power cycle of operations of one group.

From the foregoing description of the operation of the turbine, it is obvious that the ultimate exhaust of the products of combustion of each internal combustion expansion group will substantially be at atmospheric pressure, and at substantially the same velocity as the peripheral speed of the turbine rotor.

It should be noted that, while in all internal combustion reciprocating engines there is a direct bearing between compression and expansion ratios, there is no such direct bearing between such ratios in the internal combustion turbine and that the expansion ratio used in the turbine is substantially a matter of choice, and depends mostly upon the objective of an extremely efficient thermal and/or extremely efficient volumetric capacity in the turbine desired. Thus in volumetric efficient turbines, the expansion of the products of combustion would be carried out to a less degree in each expansion group, while in the thermal efficient turbine such expansion of such products would be carried out to substantially its limit in each group. Also inasmuch as such products of combustion absorb heat during extended expansion, and as the velocity of the exhaust of the turbine depends upon the peripheral speed of the turbine rotor, it is obvious that the turbine will operate cooler and more efficiently thermally if the expansion of the products of combustion is carried out to the limit in two directions within each group of expansion stages, and that the final exhaust from the buckets 45'', in the stator 3, be at right angles to the direction of rotor rotation. Inasmuch as the internal combustion turbine power plant assembly illustrated and described herein is provided with a one direction rotative rotor 1 and is particularly adaptable for driving two opposite traction wheels of an automotive vehicle, such turbine assembly would operate more efficiently if such traction wheels were each equipped with a variable reversible combined hydrodynamical and compounded planetary gearing driven transmission coupler, and while such an adaption is a matter of choice, nevertheless it is so recommended, only as a suggestion and not as a necessary part of the turbine assembly.

It is understood that the method of application of the unit power plant turbine assembly is only one of numerous methods of its application and that various minor changes may be made in practice, within the scope of the claims without digressing from the concept of the invention substantially as described and set forth.

Thus having fully described my invention, I claim:

1. In an internal combustion turbine equipped with an elongated, annular shaped, stator having a concentric bore and a rotor, provided with a plurality of buckets and combustion chambers, rotatable in one direction within said bore, and wherein said stator is equipped with at least one row of a series of tapering diffuser nozzles symmetrically spaced about the axis of said rotor and each extending tangentially, in the direction of rotor rotation, within said stator into said bore and are each provided at the opposite end thereof with a supply compressed elastic fuel mixture, the provision therein and therewith of: at least one row of a series of elongated cylindrical combustion chambers symmetrically spaced about and each extending parallel to the axis of said rotor and located in a rim portion of the latter; at least one row of a series of pairs of conically shaped combined communication and diffuser nozzles arranged in series with one another in said pairs and each pair extending tangentially, in the direction of rotor rotation, from the periphery of said rotor through said rim thereof into one end of one of said combustion chambers and having the smaller ends thereof terminating within the latter; at least one row of a series of half-moon shaped buckets each extending obliquely to the axis of said rotor and each machined tangentially into said periphery of said rotor in the direction of its rotation and wherein this row of buckets is located closely adjacent to said row of communication nozzles and is radially outward from said combustion chambers; at least one row, of a series of groups, of series of curved buckets, of at least three different lengths, each extending parallel with the axis of said rotor and each machined into said stator from and tangentially to said bore thereof in a direction opposite to that of said rotor rotation therein; means, operable during the rotation of said rotor, for igniting a charge of said compressed fuel mixture within each of said combustion chambers in a predetermined sequence; and, a means, acting in the capacity of valves, to provide a predetermined co-operative communication, operable during the rotation of said rotor, between said communication nozzles and said diffuser nozzles, and to provide other predetermined co-operative communication.

2. The combustion turbine of claim 1 characterized by, said series of groups, of curved buckets, of at least three different lengths, to consist of: a predetermined number of consecutive alternate intermediate and short length buckets starting adjacent to each of said tapering diffuser nozzles, and terminating in a series of long buckets wherein each of the latter is provided with access to the atmosphere and which series thereof terminates adjacent to the next succeeding tapering diffuser nozzle; a series of short buckets initiating adjacent the starting point mentioned and terminating adjacent the last of said long buckets of the preceding group of such, and wherein such series of short buckets are in the same radial plane as said half-moonshaped buckets in said rotor; means to provide co-operative communication between said communication nozzles and the adjacent ends of the intermediate and the long length buckets; and, means to provide co-operative communication between each of said half-moonshaped buckets and all of said different length buckets.

3. The combustion turbine of claim 1, wherein said means, operable during the rotation of said rotor, for igniting a charge of said compressed fuel mixture within each of said combustion chambers in a predetermined sequence, consists of: an insulated distributor head secured to said stator and surrounding an insulated distributor rotor which latter is rotatable with the turbine rotor, and via which distributor rotor, ignition electricity is delivered directly in a predetermined sequence, to a series of adjacent ignition plugs wherein there is one of the latter provided for and having access with each adjacent of said combustion chambers.

4. The combustion turbine of claim 1, wherein said means, acting in the capacity of valves, to provide a communication, operable during the rotation of said rotor, between said communication nozzles and said diffuser nozzles, and said communication nozzles form the sole valve means by which a supply of compressed fuel mixture can be introduced from said diffuser nozzles to each combustion chamber and also the sole valve means by which the products of combustion can be released from each of said combustion chambers into the adjacent ends of the adjacent of said curved buckets.

5. An internal combustion turbine motive power assembly unit consisting in the combination of: an annular shaped turbine stator member extending in tandem with a similar shaped housing member of a multiple-geared fuel mixture compressor wherein such housing member of the latter extends in tandem with an annular shaped casing member of a multiple-geared reduction gearing; means whereby a sun-gear of said reduction gearing and a sun-gear of said compressor are mounted coaxially in tandem with a rotor of said turbine upon a tubular shaft rotatable in one direction within all three members mentioned; means whereby a series of compressor gears, symmetrically spaced about the axis of and meshing with said sun-gear of said compressor, extend in tandem with a similar series of reduction-gearing gears which latter mesh with said sun-gear of said reduction-gearing and also with an orbit-gear of the latter; means operable through teeth extending externally of said orbit-gear, and forming a ring gear, whereby said tubular shaft can be rotatively started; and, means whereby said orbit-gear is secured to rotate with an elongated delivery shaft which latter extends internally to said tubular shaft and beyond the three members mentioned, and rotates at a reduced speed relative to that of said tubular shaft and in the opposite direction of rotation thereto.

6. In an internal combustion turbine equipped with a stator having a rotor, rotatable in one direction therein and provided with a plurality of buckets and combustion chambers, and a pair of rows of series of tapering diffuser nozzles symmetrically spaced, in said stator, about the axis of said rotor and wherein each nozzle is provided to extend through said stator tangentially in the direction of rotor rotation therein and to initiate in a means of supply of combustible fuel mixture and to terminate with its larger end open to the periphery of said rotor, the provision therein and therewith of the combination of: a pair of rows of cylindrical combustion chambers symmetrically spaced about and each extending parallel with said axis of said rotor and located within a rim periphery of the latter, and wherein the rows of said chambers are separated by an exhaust compartment extending jointly into said rotor and said stator; a pair of rows of half-moon-shaped obliquely extending buckets each machined tangentially into said rim of said rotor in the direction of rotation of the latter and wherein each row of said buckets is located radially outward from one of the pair of rows of said combustion chambers; a pair of conically shaped communication nozzles for each of the latter and wherein each such pair are in series with one another in the direction of rotor rotation, and each pair extends tangentially from the periphery of said rotor into the latter in the direction of its rotation and each pair terminates, at the smaller diameter ends thereof, within their respective combustion chamber; a pair of rows, of groups of series, of different lengths of curved and semi-curved expansion chamber buckets each extending parallel with said axis and machined into said stator from and tangentially to a bore therein in a direction opposite to that of said rotor rotation; means for igniting a charge of combustible fuel mixture in each respective combustion chamber in a predetermined sequence; and, means, operable during the rotation of said rotor, to provide a predetermined cooperative communication, between each of said communication nozzles and each adjacent of said half-moon-shaped buckets directly in a predetermined manner.

7. The combustion turbine of claim 6 wherein, said pair of rows of groups of series of different lengths of curved expansion chamber buckets consists in each of said groups, of: a predetermined number of consecutive alternate intermediate and short length curved buckets starting adjacent to the respective tapering diffuser nozzle of each group and terminating in a series of long semi-curved buckets each provided with access to said exhaust compartment, and which series terminates adjacent to the next succeeding group diffuser nozzle; a series of short curved buckets initiating adjacent the starting point mentioned and terminating adjacent the last of said long semi-curved buckets of the preceding group, and wherein such series of short curved buckets are located radially outward from the adjacent row of said half-moon-shaped buckets; and, wherein each of such half-moon-shaped buckets in the adjacent row cooperates with all of said curved buckets in such group, and wherein the communication nozzles of the adjacent row of combustion chambers co-operate with each of said intermediate length of curved and said series of long length of semi-curved buckets as well as with said diffuser nozzle of such group in a predetermined manner during the rotation of said rotor.

8. The combustion turbine of claim 6 wherein, said means operable during the rotation of said rotor to provide a predetermined co-operative communication between each of said communication nozzles and each of said half-moon-shaped buckets, consists of means by which each pair of said communication nozzles co-operates consecutively with each tapering diffuser nozzle in the adjacent row of the latter, in providing their respective combustion chamber with a fresh charge of combustible fuel mixture prior to its displacement past each adjacent one of said series of different lengths of curved expansion chamber buckets, and wherein said pair of communication nozzles then co-operate consecutively with each of said intermediate length of curved buckets and then co-operate with said series of long semi-curved buckets; and, each of said half-moon-shaped buckets co-operates, in a predetermined sequence, with all of said different lengths of said curved and semi-curved buckets in the adjacent group of same in providing a means of pressure velocity compounding, in a dual rotative and anti-rotative direction simultaneously, the products of combustion of each such charge of combustible fuel mixture supplied to each adjacent one of said combustion chambers via said pair of communication nozzles thereof.

9. An internal combustion turbine motive power assembly unit forming the intermediate portion extending between the axle housings of two opposite traction wheels of an automotive vehicle, and comprising in combination: an annular shaped turbine stator extending in tandem with its annular shaped fuel mixture compressor housing and with its reduction gearing annular shaped housing in forming said intermediate portion mentioned; a cylindrical turbine rotor rotatable in one direction within said stator with a tubular shaft and coaxially in tandem with a sun-gear of said compressor and which latter is rotatable within said compressor housing, and also in tandem with a sun-gear of said reduction gearing which latter is rotatable within said reduction gearing housing; wherein both said compressor and said reduction gearing are of multiple geared type wherein each is provided with a series of gears rotatable in tandem and which are symmetrically spaced about the axis of their respective sun-gears; and, a driven orbit-gear of said reduction gearing provided to be secured to an elongated driven shaft extending internally to said tubular shaft and throughout said intermediate portion and forming the driving means of two adjacent stub-shafts one for each of said two opposite traction wheels, and wherein said orbit-ring-gear rotates in the opposite direction to and at a reduced speed in relation to said tubular shaft, and wherein said orbit gear is provided with external gearing teeth by which to drive a combined electrical generator and starting motor or by which it may be driven by the latter.

10. An internal combustion turbine motive power assembly unit, comprising in combintion: a turbine stator and its rotor extending in tandem respectively with a housing and sun-gear of a multiple-geared, combustible liquid drenched, compressor and in tandem respectively with a housing and sun-gear of a multiple-geared reduction gearing; and, wherein an orbit-gear of said reduction gearing is mounted upon and rotatable with a reduced speed power delivery shaft extending beyond said motive power assembly and internally to a tubular shaft, wherewith the latter, said rotor and the sun-gears mentioned are rotatable in tandem.

11. The combustion turbine motive power assembly of claim 10, wherein said multiple-geared, combustible liquid drenched compressor is provided with a means for automatically drenching the gears thereof with a combustible liquid in spray form on a suction side thereof, and with a means on a discharge side thereof for automatically draining off surplus of such combustible liquid back to a combined reservoir and sump from which latter said liquid was supplied to said suction side.

12. In an internal combustion turbine equipped with a one direction rotatable rotor provided with at least one ignition plug equipped combustion chamber located within a rim thereof and a row of series of obliquely extending half-moon-shaped expansion chamber buckets, which latter are machined tangentially into the periphery of such rotor in the direction of its rotation, and wherein said rotor is rotatable within a bore of an annular shaped turbine stator which latter is equipped with a combustible mixture supply diffuser nozzle extending therethrough and terminating tangentially within said bore in the direction of rotor rotation therein, and, wherein said stator is further equipped with a series of different lengths of curved expansion chamber buckets and a series of semi-curved exhaust chamber buckets, each and all machined tangentially to said bore into said stator in the opposite direction to said rotor rotation, the provision therein and therewith of: a pair of conically shaped combined communication parts and nozzles extending in series with one another from said periphery of said rotor tangentially, in the direction of the latter's rotation, through the rim of said rotor and each nozzle terminating at its smaller diameter end within said combustion chamber, and wherein said pair of nozzles are the sole means of valving combustible fuel mixture into said combustion chamber from said diffuser nozzle, and of valving the products of combustion of such combustible fuel mixture by releasing such products from said combustion chamber into said expansion and exhaust chamber buckets.

13. In an internal combustion turbine assembly and in tandem combination therein and therewith a stator and a variable speed rotatable rotor thereof, a plurality of means consisting of: a multiple geared elastic fuel mixture compressor member in tandem relation with a multiple geared shaft speed reducing means, wherein a rotatable tubular shaft coaxially carries said rotor and a sun-gear of said compressor means in tandem with a sun-gear of said shaft speed reducing means, and wherein a series of gears of the latter extend coaxially in tandem with a series of gears of said compressor means, and wherein the first mentioned gears rotate an orbit gear in the opposite direction of rotation and at a reduced speed in relation to the rotation of said tubular shaft, also wherein said orbit-gear is coaxially carried by a rotatable driven shaft which latter extends concentrically internally throughout and beyond said tubular shaft; wherein said multiple geared elastic fuel mixture compressor is an interconnected means of supply of such fuel mixture for said turbine for combustion purposes therein; and, wherein said multiple geared shaft speed reducing means is a direct connected means for reducing the rotative speed of said rotor of said turbine down to the rotative speed of said rotatable driven shaft.

14. In an internal combustion turbine assembly and in combination with the combustion chambers and power producing means for rotating a rotor in one direction, and under variable speeds, in a bore of a stator thereof: a multiple geared type of compressor means for compressing an elastic fuel mixture to be delivered to said combustion chambers, extending in tandem with a multiple geared type of reduction means for reducing the rotative speed of said rotor down to the rotative speed of a delivery shaft, and wherein said stator and rotor respectively extend in tandem with a gearing housing and sun-gear of said compressor also in tandem respectively with a casing and a sun-gear of said multiple geared reduction means, and wherein a series of gears of said compressor means rotate coaxially in tandem with a similar series of gears of said multiple geared reduction means, and wherein the latter's series of gears mesh with and rotate an orbit-gear of such reduction means, and wherein said rotor and both of said sun-gears are carried by a rotatable tubular shaft, wherein the latter said delivery shaft extends concentrically internally throughout and beyond and carries said orbit-gear as it rotates at a reduced speed and in the opposite direction of rotation to such tubular shaft.

15. In an internal combustion turbine equipped with a stator and a rotor variably rotatable in one direction in a bore thereof, and wherein said stator is equipped with at least one tapering elastic fuel mixture diffuser nozzle extending therethrough tangentially to and terminating in said bore in the direction of rotor rotation, and wherein said rotor is equipped with at least one closed combustion chamber located within a rim periphery thereof, and is further equipped with a row of series of half-moon shaped expansion chamber buckets extending obliquely tangentially into such rim periphery in the direction of rotor rotation, and, wherein said combustion chamber is provided with an ignition plug means for igniting a combustible fuel mixture charge therewithin, the provision therein and combination therein and therewith of: means in the form of a pair of conical shaped combined communication and diffuser nozzles extending in series with one another in the direction of rotor rotation tangentially from the periphery of said rotor through the rim of said rotor and into said combustion chamber and each terminating with its smaller end within the latter; means in the form of a series of at least three different lengths of curved expansion chamber buckets all of which are in constant communication with said half-moon-shaped expansion chamber buckets and the longer of which have access to the atmosphere and wherein all of these curved buckets extend from said bore tangentially into said stator in a direction opposite to that of said rotor rotation within said bore; and, means whereby, during the variable rotation of said rotor within said bore, said pair of conical shaped nozzles form a valving means for said combustion chamber in that they are the sole means by which an elastic fuel mixture can be valved to said combustion chamber from said tapering diffuser nozzle and are also the sole means by which the products of combustion of such fuel mixture, subsequently to the latter's ignition within said combustion chamber, can be valved from such combustion chamber and simultaneously diffused into a series of the intermediate and long lengths of said expansion chamber buckets.

16. An internal combustion turbine unit power plant assembly comprising in combination: an annular shaped turbine stator member extending in tandem with a similarly shaped housing member of a multiple geared type of fuel mixture compressor similarly extending in tandem with the housing of a multiple geared type of reduction gearing means, wherein a rotor of said turbine rotates in one direction within a bore of said stator and in tandem combination with a sun-gear of said compressor and a sun-gear of such reduction gearing means; a pair of rows of series of tapering diffuser nozzles symmetrically spaced about the axis of said bore and wherein each nozzle is provided to extend tangentially, in the direction of rotor rotation, within said stator and to terminate with its larger diameter end opening into said bore and wherein its smaller diameter end initiates in a means of supply of compressed fuel mixture received from said compressor; a pair of rows of series of elongated cylindrical combustion chambers extending axially within said rotor in a rim periphery thereof and wherein each chamber is provided with a pair of converging nozzles arranged in series and provided to be machined tangentially, in the direction of rotor rotation, from the periphery of said rotor into their respective combustion chamber; a pair of rows of series of half-moon-shaped expansion chamber buckets each extending axially and obliquely tangentially into said periphery of said rotor in the direction of the latter's rotation and wherein each row is located adjacent to one row of said nozzles and radially outward from one row of said combustion chambers; an annular shaped exhaust compartment provided with access to the atmosphere and located jointly in said stator and said rotor intermediate to said pair of rows of expansion chamber buckets; a pair of rows, of series of groups, of series of curved and semi-curved buckets of at least three different predetermined lengths wherein each such bucket extends axially tangentially into said stator, from said bore, in opposite to the direction of rotor rotation, and wherein the intermediate length buckets progressively increase in depth within their lengths and are provided with curved ends; means, operable during the rotation of said rotor, whereby each pair of converging nozzles, in one row, co-operates consecutively with each of said diffuser nozzles in an adjacent row, whereby each such charge in each such combustion chamber is then ignited by a predetermined means and combustion of each such charge is initiated, whereupon each of said converging nozzles of each combustion chamber co-operates with one each of said intermediate length buckets and the expansion of each such charge under combustion is initiated and forms expanding products of combustion; such products of combustion of each such charge are then introduced into two adjacent of said half-moon-shaped buckets and a dual pressure velocity compounding of such products follows, as one-half of such products simultaneously flows in the direction of rotor rotation and the other one-half in opposite to such direction of rotation as such divided products expand jointly in the last mentioned buckets and the adjacent series of said different lengths of buckets, from the longer of which latter buckets such products of combustion are exhausted to the atmosphere; an elongated power delivery shaft provided to extend throughout and beyond a tubular shaft, upon which said rotor and sun-gears are mounted, and to be rotatively driven by an orbit-gear, of said reduction gearing means, at a reduced speed of rotation in relation to that of said rotor; and, means for mounting such unit power plant assembly between two opposite traction wheels.

17. An internal combustion turbine comprising in combination: an annular shaped turbine stator provided with a concentric bore and an elongated turbine rotor rotatable in one direction within said bore; at least one row of series of tapering diffuser nozzles wherein each nozzle extends tangentially within said stator, and terminates with its larger diameter end within said bore in the direction of rotor rotation, and initiates in a supply of compressed elastic fuel mixture; at least one row of series of combustion chambers wherein each chamber is located within a rim periphery of said rotor and is provided with a pair, in series, of conical nozzles each machined tangentially, in the direction of rotor rotation, from said periphery of said rotor convergingly into their respective combustion chamber; at least one row of series of semi-circular shaped expansion chamber buckets located adjacent to said row of conical nozzles radially outward from said row of combustion chambers, and wherein each bucket extends tangentially into said periphery of said rotor in the direction of the latter's rotation; at least one row, of series of groups, of series of curved and semi-curved expansion chamber buckets of at least three different predetermined lengths, and wherein each such bucket is machined tangentially into said stator, from said bore, in a direction opposite to the direction of rotor rotation, and wherein the intermediate length buckets are provided with rounded ends, and wherein further the longer length, semi-curved, buckets have access to the atmosphere via communication with an adjacent exhaust compartment located within said stator; means operable during the rotation of said rotor, to provide consecutive co-operation between each pair of said conical nozzles with each diffuser nozzle, of each such group, and whereby each consecutive combustion chamber, within each group, is first scavenged, from end to end, by said compressed fuel mixture admitted thereinto and is then provided with a charge of such combustible fuel mixture; a similar means to provide consecutive cooperation between each pair of said conical nozzles and said intermediate and long lengths of buckets, of each such groups; means for consecutively igniting and producing combustion of each combustible charge within each combustion chamber of each such group in a predetermined sequence, subsequently to its admission into each such combustion chamber and preceding the last mentioned co-operation of said conical nozzles of such respective combustion chamber in such group; means to provide a predetermined co-operation, during the rotation of said rotor, between said semi-circular shaped buckets, and said curved and semi-curved buckets of each group of the latter, wherein such co-operation, in combination with the second mentioned co-operation of said conical nozzles, provides a means whereby the products of combustion of each charge, ignited within each combustion chamber of each group, is pressure velocity compounded, in a dual manner within such co-operating buckets, simultaneously both in and opposite to the direction of rotor rotation; and, a multiple geared type of fuel mixture compressor for supplying compressed fuel mixture to said diffuser nozzles, and an adjacent multiple geared type of shaft speed reduction means extending in tandem with said turbine stator, and wherein such compressor and such reduction gearing means are each provided with driving sun-gears mounted upon a tubular shaft in tandem with said turbine rotor, and wherein an orbit-gear of said reduction gearing means rotatively drives an elongated power delivery shaft which latter extends internally througtout and beyond said tubular shaft and rotates at a reduced speed relative thereto.

References Cited in the file of this patent

UNITED STATES PATENTS

| Number | Name | Date |
|---|---|---|
| 332,040 | Begin | Dec. 8, 1885 |
| 1,200,133 | Reed | Oct. 3, 1916 |
| 1,271,777 | Saunders | July 9, 1918 |
| 1,339,730 | Williams | May 11, 1920 |
| 1,340,563 | Schmid | May 18, 1920 |
| 1,934,237 | Russell | Nov. 7, 1933 |
| 2,222,183 | Rocheville | Nov. 19, 1940 |
| 2,310,513 | Burns | Feb. 7, 1943 |
| 2,561,005 | Wuehr | July 17, 1951 |